US009323316B2

(12) United States Patent
Bhandaru et al.

(10) Patent No.: US 9,323,316 B2
(45) Date of Patent: Apr. 26, 2016

(54) DYNAMICALLY CONTROLLING INTERCONNECT FREQUENCY IN A PROCESSOR

(75) Inventors: Malini K. Bhandaru, Sudbury, MA (US); Ankush Varma, Hillsboro, OR (US); James R. Vash, Littleton, MA (US); Monica Wong-Chan, Concord, MA (US); Eric J. Dehaemer, Shrewsbury, MA (US); Christopher Allan Poirier, Sr., Fort Collins, CO (US); Scott P. Bobholz, Bolton, MA (US)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 13/997,386

(22) PCT Filed: Mar. 13, 2012

(86) PCT No.: PCT/US2012/028902
§ 371 (c)(1),
(2), (4) Date: Jun. 24, 2013

(87) PCT Pub. No.: WO2013/137862
PCT Pub. Date: Sep. 19, 2013

(65) Prior Publication Data
US 2014/0208141 A1 Jul. 24, 2014

(51) Int. Cl.
*G06F 1/32* (2006.01)
*G06F 9/38* (2006.01)
*G06F 12/08* (2006.01)

(52) U.S. Cl.
CPC ............. *G06F 1/3243* (2013.01); *G06F 1/324* (2013.01); *G06F 1/3206* (2013.01);
(Continued)

(58) Field of Classification Search
CPC ....... G06F 1/3202; G06F 1/3231; G06F 1/26; G06F 1/206; G06F 1/3228; G06F 1/08; G06F 1/3289; G06F 1/266; H04L 12/12; H04L 12/10
USPC .......................... 713/300, 210, 320, 322, 323
See application file for complete search history.

(56) References Cited

U.S. PATENT DOCUMENTS 5,163,153 A 11/1992 Cole et al.
5,522,087 A 5/1996 Hsiang
(Continued)

FOREIGN PATENT DOCUMENTS

EP 1 282 030 A1 5/2003

OTHER PUBLICATIONS

U.S. Patent and Trademark Office, Office Action mailed Aug. 5, 2014 in U.S. Appl. No. 13/600,568, with Reply to Office Action filed on Oct. 29, 2014.
(Continued)

*Primary Examiner* — Zahid Choudhury
(74) *Attorney, Agent, or Firm* — Trop, Pruner & Hu, P.C.

(57) ABSTRACT

In one embodiment, the present invention includes a method for determining whether a number of stalled cores of a multicore processor is greater than a stall threshold. If so, a recommendation may be made that an operating frequency of system agent circuitry of the processor be increased. Then based on multiple recommendations, a candidate operating frequency of the system agent circuitry can be set. Other embodiments are described and claimed.

13 Claims, 8 Drawing Sheets

(52) U.S. Cl.
CPC ........... *G06F 1/3296* (2013.01); *G06F 9/3885* (2013.01); *G06F 12/0802* (2013.01); *Y02B 60/1217* (2013.01); *Y02B 60/1285* (2013.01)

(56) References Cited

U.S. PATENT DOCUMENTS

| | | | |
|---|---|---|---|
| 5,590,341 A | 12/1996 | Matter | |
| 5,621,250 A | 4/1997 | Kim | |
| 5,931,950 A | 8/1999 | Hsu | |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,412,611 B2 | 8/2008 | Tipley | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,596,705 B2 | 9/2009 | Kim | |
| 7,730,340 B2 | 6/2010 | Hu et al. | |
| 8,429,441 B2 | 4/2013 | Baker et al. | |
| 8,438,359 B2 | 5/2013 | Kasahara et al. | |
| 8,463,973 B2 | 6/2013 | Naffziger et al. | |
| 8,560,869 B2 | 10/2013 | Allarey | |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0025069 A1 | 2/2004 | Gary et al. | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2005/0289365 A1* | 12/2005 | Bhandarkar | G06F 1/3203 713/300 |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0033425 A1* | 2/2007 | Clark | 713/320 |
| 2007/0043964 A1 | 2/2007 | Lim et al. | |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0005592 A1 | 1/2008 | Allarey et al. | |
| 2008/0028240 A1 | 1/2008 | Arai et al. | |
| 2008/0162972 A1 | 7/2008 | Liu et al. | |
| 2008/0250260 A1 | 10/2008 | Tomita | |
| 2009/0006871 A1 | 1/2009 | Liu et al. | |
| 2009/0089543 A1 | 4/2009 | Gunther et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0064162 A1 | 3/2010 | Rotem et al. | |
| 2010/0115296 A1 | 5/2010 | Finkelstein et al. | |
| 2010/0115309 A1 | 5/2010 | Carvalho et al. | |
| 2010/0138675 A1 | 6/2010 | Nikazm et al. | |
| 2010/0146513 A1 | 6/2010 | Song | |
| 2010/0191997 A1 | 7/2010 | Dodeja et al. | |
| 2011/0113270 A1 | 5/2011 | Carter et al. | |
| 2011/0138388 A1 | 6/2011 | Wells et al. | |
| 2011/0154090 A1 | 6/2011 | Dixon et al. | |
| 2011/0161683 A1 | 6/2011 | Zou et al. | |
| 2011/0258477 A1 | 10/2011 | Baker et al. | |
| 2012/0054515 A1 | 3/2012 | Naffziger et al. | |
| 2012/0072750 A1 | 3/2012 | Jahagirdar et al. | |
| 2012/0079290 A1 | 3/2012 | Kumar | |
| 2012/0246506 A1 | 9/2012 | Knight | |
| 2013/0061064 A1 | 3/2013 | Ananthakrishnan et al. | |
| 2013/0080803 A1 | 3/2013 | Ananthakrishnan et al. | |
| 2013/0080804 A1 | 3/2013 | Ananthakrishnan et al. | |
| 2013/0111120 A1 | 5/2013 | Ananthakrishnan et al. | |
| 2013/0111121 A1 | 5/2013 | Ananthakrishnan et al. | |
| 2013/0111226 A1 | 5/2013 | Ananthakrishnan et al. | |
| 2013/0111236 A1 | 5/2013 | Ananthakrishnan et al. | |
| 2013/0346774 A1 | 12/2013 | Bhandaru et al. | |
| 2014/0068284 A1 | 3/2014 | Bhandaru et al. | |
| 2014/0195829 A1 | 7/2014 | Bhandru et al. | |
| 2014/0208141 A1 | 7/2014 | Bhandaru et al. | |

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scaling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of a Processor," by Intel Corporation.

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

(56) References Cited

OTHER PUBLICATIONS

U.S. Appl. No. 13/600,568, filed Aug. 31, 2012, entitled, "Configuring Power Management Functionality in a Processor," by Malini K. Bhandaru, et al.
International Searching Authority, "Notification of Transmittal of the International Search Report and the Written Opinion of the International Searching Authority," mailed Nov. 20, 2012, in International application No. PCT/US2012/028902.
U.S. Patent and Trademark Office, Office Action mailed on Mar. 25, 2015 and Reply filed on Jun. 22, 2015, in U.S. Appl. No. 13/785,259.
Microsoft Press Publisher, Microsoft Computer Dictionary, Microsoft Press, Mar. 15, 2002, ISBN-13: 978-0-7356-1495-6; ISBN 10: 0-7356-1495-4, pp. 1-8.
U.S. Patent and Trademark Office, Office Action mailed Jul. 17, 2015, in U.S. Appl. No. 13/997,288.
U.S. Patent and Trademark Office, Office Action mailed Jul. 23, 2015, in U.S. Appl. No. 13/997,757.
U.S. Patent and Trademark Office, Office Action mailed on Jul. 17, 2015 and Reply filed Oct. 13, 2015 in U.S. Appl. No. 13/997,288.
U.S. Patent and Trademark Office, Reply to Office Action filed Sep. 22, 2015 in U.S. Appl. No. 13/997,757.

\* cited by examiner

DYNAMICALLY CONTROLLING INTERCONNECT FREQUENCY IN A PROCESSOR

TECHNICAL FIELD

Embodiments relate to power management of an integrated circuit.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, ultrabooks, tablets, mobile phones, processors, embedded systems, etc. become even more prevalent (from inclusion in the typical computer, automobiles, and televisions to biotechnology).

Power and thermal management issues are considerations in all segments of computer-based systems. While in the server domain the cost of electricity drives the need for low power systems, in mobile systems battery life and thermal limitations make these issues relevant. Optimizing a system for maximum performance at minimum power consumption is usually done using the operating system (OS) or system software to control hardware elements. Most modern OS's use the Advanced Configuration and Power Interface (ACPI) standard (e.g., Rev. 3.0b, published Oct. 10, 2006) for optimizing the system in these areas.

An ACPI implementation allows a processor core to be in different power-saving states (also termed low power or idle states), generally referred to as so-called C1 to Cn states. In addition to power-saving states, performance states or so-called P-states are also provided in ACPI. These performance states may allow control of performance-power levels while a core is in an active state (C0). In general, multiple P-states may be available, from P0-PN. There can be a range of higher frequency/performance states that are generally referred to as turbo mode.

In most multicore processors, an interconnect fabric that connects the cores, caches, memory, input/output devices and more consumes about a third of the total power budget. Interconnect needs, however, are workload dependent and consequently dynamic. A faster interconnect than necessary translates to power wasted, lost as heat (increasing cooling costs and reduced battery life), and is power that is unavailable to operate the cores faster. A slower interconnect than necessary hampers forward progress on the cores; it is a scenario in which performance needs are better served by diverting power from the cores to interconnect.

DETAILED DESCRIPTION

Figure 1:
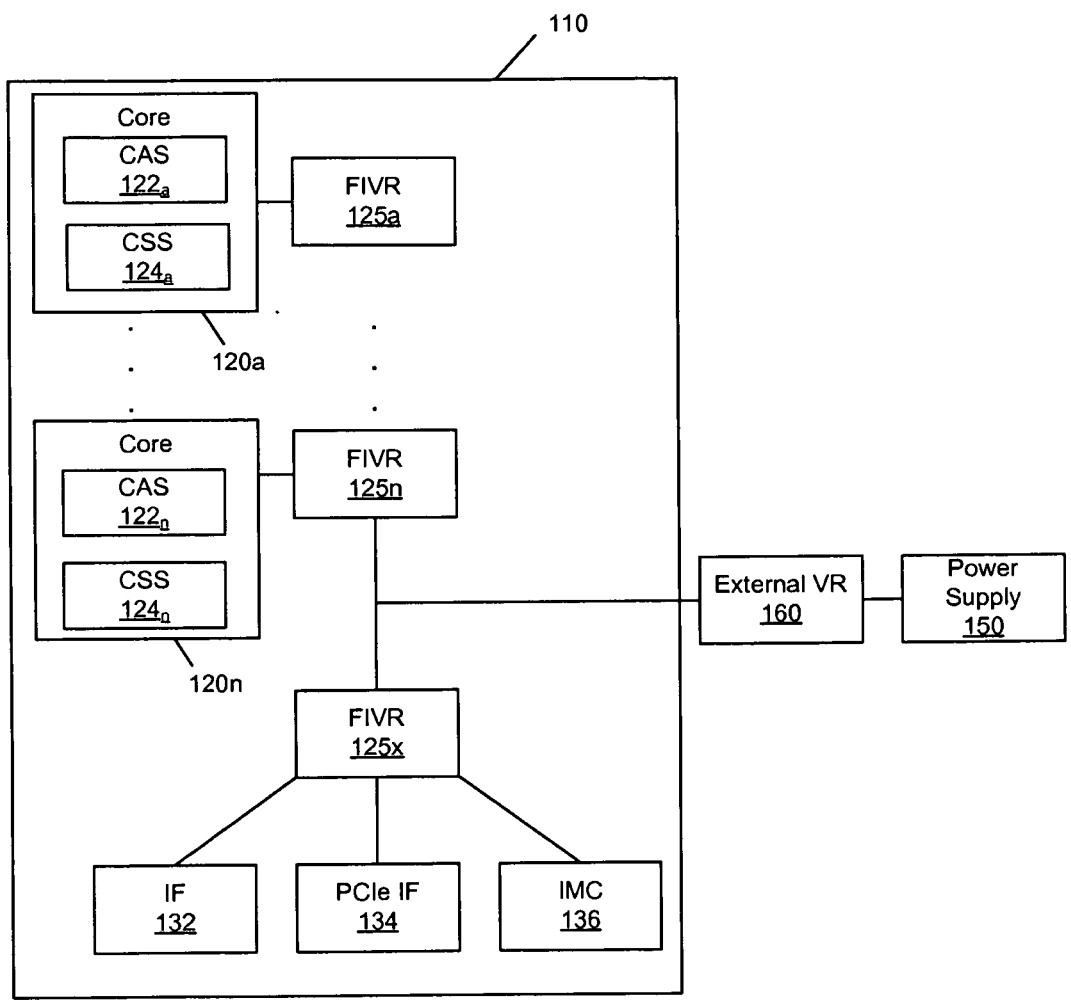
FIG. 1 is a block diagram of a system in accordance with one embodiment of the present invention.

Embodiments may monitor various information, including but not limited to interconnect traffic, core activity levels, among other information to determine usage of uncore circuitry of a processor, to detect congestion and under-utilization. This information can be used to adapt the operating frequency of such circuitry to changing workload characteristics, and thus gain power and performance benefits. Note that this uncore circuitry can include interconnect structures to couple cores to caches and other on-chip and off-chip circuitry, one or more cache memories, as well as certain non-core logic circuitry such as a power control unit (PCU) and so forth.

Embodiments may be particularly suitable for a multicore processor in which each of multiple cores can operate at an independent voltage and frequency point. As used herein the term "domain" is used to mean a collection of hardware and/or logic that operates at the same voltage and frequency point. In addition, a multicore processor can further include other non-core processing engines such as fixed function units, graphics engines, and so forth. Such processor can include independent domains other than the cores, such as one or more domains associated with a graphics engine (referred to herein as a graphics domain) and one or more domains associated with non-core circuitry, referred to herein as an uncore or a system agent. Although many implementations of a multi-domain processor can be formed on a single semiconductor die, other implementations can be realized by a multi-chip package in which different domains can be present on different semiconductor die of a single package.

According to an OS-based ACPI mechanism, a processor can operate at various power and performance states or levels. With regard to power states, ACPI specifies different power consumption states, generally referred to as C1 to Cn states. When a core is active, it runs at a C0 state, and when the core is idle it may be placed in a core low power state, also called a core non-zero C-state (e.g., C1-C6 states). When all cores of a multicore processor are in a core low power state, the processor can be placed in a package low power state, such as a package C6 low power state.

In addition to these power states, a processor can further be configured to operate at one of multiple performance states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies, also referred to herein as turbo mode frequencies, above this P1 frequency. The highest such frequency may correspond to a maximum turbo frequency (P01), which is a highest frequency at which a domain can operate. Note that the terms "performance state" or "P-state" can be interchangeably used with the term "operating frequency" (or more generally "frequency") as the frequency at which a core operates has a direct correlation to its performance. Thus as used herein a higher performance state correlates to a higher operating frequency.

When a processor package is in an idle state, namely when all of the cores are in a low power state, the only traffic stems from attached input/output (IO) devices and sibling sockets in a multi-socket system. In such cases, the interconnect operating frequency may be reduced to a value sufficient to comfortably meet the IO and intersocket traffic needs, which is referred to herein as an IO traffic threshold frequency. Although the scope of the present invention is not limited in this regard, in some embodiments this threshold frequency may be between approximately 1.2 and 4.0 gigahertz (GHz) as examples.

Different information regarding actual usage of an interconnect may be evaluated in determining an appropriate frequency for operating the uncore. In one embodiment, such information can be obtained from a variety of sensors and detectors, including one or more detectors per core, which can provide information regarding core activity or stalls. Such sensors can include a core activity sensor and a core stall sensor. Using information from these sensors, information regarding uncore contention, pressure in the shared cache, or bandwidth limitations may be discerned. However, core stalls do not provide visibility into localized congestion along the interconnect, nor conclusively indicate under-utilization, information regarding both of which may be valuable for better power utilization and performance.

To this end, embodiments may also provide a set of distributed configurable traffic sensors that can be used to measure traffic at various points within the uncore circuitry. In one embodiment, such sensors can be located at each interface unit coupled to the interconnect, e.g., at each interconnect stop, where the interconnect is configured as a ring interconnect. However, other topologies can be a ring, mesh, star, tree, among many others. The traffic sensors may be used to measure traffic along each direction, of each data type, and along each interconnect segment. Embodiments thus may monitor usage of an interconnect to detect traffic congestion, under-utilization, and uncore contention.

A multi-processor system can be abstracted as a queue with a service agent. The various cores inject traffic into the queue, and the service agent(s) by operating at a higher frequency drain the queue faster. The goal is to balance arrival and service rates, and in so doing consume the least amount of power and increase performance.

Embodiments may leverage information from three kinds of distributed sensors. Based on this information, logic such as uncore frequency control logic of a PCU can determine an appropriate uncore operating frequency. More specifically, based on dynamic workload behavior captured by the sensors, the logic can adapt the uncore operating frequency to gain power-performance benefits.

The first two sensors, core stall sensors and core activity sensors, may be present within each core in a multicore processor. The core stall sensor measures the number of cycles all the threads of a core are simultaneously stalled waiting for a load or a store. This could happen because of a cache miss or because of interconnect traffic congestion. The core activity sensor captures the number of cycles one or more threads on a core are active. The third sensor, referred to herein as a traffic sensor, measures traffic between interconnect stops. More specifically, these sensors may measure usage and possible congestion due to dynamic traffic patterns between cores, memory, input/output components or to other sockets in a multi-socket system.

The logic collects and analyzes the data periodically. In one embodiment, both the period and adapt step size are functions of an energy performance bias setting, which may be configured by a consumer, OS or other entity. In one embodiment, an uncore frequency scaling algorithm increments, decrements, or leaves unchanged interconnect operating frequency depending on whether it is determined that the system is under stress, under-utilized, or stable respectively.

Thus every observation period, which itself can be a configurable quantity, data is collected from all cores. Referring now to Table 1, shown is pseudocode for operation of a stall sensor in accordance with one embodiment of the present invention.

TABLE 1

Core Stall Sensor
// On each physical processor core, if each of its associated logical processors is
stalled
// waiting for either a load or store if (wait > stall_threshold) {
core_stall_count ++;
}

In one embodiment, the stall threshold is architecture dependent and typically reflects the number of cycles that it takes a core to retrieve a data line from a shared cache memory using the shared uncore interconnect.

Only cores that are relatively "active", as determined by a core activity threshold (configurable) when operating at the lowest possible frequency are considered in any stall classification. This allows the uncore frequency scaling algorithm to be sensitive to both idle and heavy utilization scenarios without compromising latency requirements.

In one embodiment, the energy performance bias may be a user-configured quantity range (e.g., 0-15), with 0 implying high performance and 15 implying energy bias. This energy performance bias may be used to select values for the thresholds used to classify a core stall count as intolerable. The bias values may also guide by how much to increase/decrease uncore frequency. For instance, with a performance bias, frequency may increase more rapidly and decrease less rapidly.

The power control unit (PCU) receives all sensor data and uncore frequency control logic of the PCU may be used to analyze the data to adapt the uncore frequency as necessary. The goal of an uncore frequency scaling algorithm in accordance with an embodiment of the present invention is to allocate power between core and interconnect power planes, to increase overall system performance and possibly save power. In each power plane both voltage and frequency can be modified.

Referring now to Table 2, shown is pseudocode for a uncore frequency scaling algorithm in accordance with one embodiment of the present invention.

TABLE 2

```
UFS Algorithm
every ADAPT_PERIOD {// configurable period
    int dyn_uncore_ratio = current_uncore_ratio;
    if (package_idle) {// all cores in socket idle
        dyn_uncore_ratio = max(QOS_UNCORE_FLOOR ,
        IO_Plimit);
    } else {
        higher_uncore_ratio = min((current_uncore_ratio +
            UFS_RATIO_INC_STEP), MAX_UNCORE_RATIO);
        lower_uncore_ratio = max((current_uncore_ratio -
UFS_RATIO_DEC_STEP),
            QOS_UNCORE_FLOOR );
        int recommend = 0; // no change
        if ((num_cores_stalled > (num_cores_active *
        TOLERATE_CORES_STALL_FACTOR)) ||
            (max_uncore_traffic >=
            theoretical_max(current_uncore_ratio)) {
            recommend = +1;
        } else if (max_uncore_traffic <=
        theoretical_max(lower_uncore_ratio)) {
            recommend = -1;
        }
        // recommendBuf is a circular buffer, to preserve the last n
        recommendations for hysterisis
        recommendBuf[n] = recommend;
        // observe trend
        int trend = sum (recommendBuf[i]) 0 <= i < n
        if (trend == increase_threshold) {
          dyn_uncore_ratio = higher_uncore_ratio;
        } else if (trend == decrease_ threshold) {
          dyn_uncore_ratio = lower_uncore_ratio
        } else {// no change
          dyn_uncore_ratio = current_uncore_ratio;
        }
    }
    dyn_uncore_ratio = min(dyn_uncore_ratio,
    MAX_UNCORE_RATIO);
    if (dyn_uncore_ratio != current_uncore_ratio) {
       for (0 <= i < n ) recommendBuf[i] = 0; // reset after
       recommending change
    }
    return dyn_uncore_ratio;
}
```

In the code shown, uncore_floor is a quality of service (QoS) floor setting, meaning the lowest uncore frequency allowed, while IO_Plimit is a floor adequate to sustain traffic comfortably from sibling sockets in a multi-socket assembly and/or attached IO devices. This parameter may be a dynamic quantity based on traffic from these components.

When a socket is idle (that is, all cores are in a non-C0 state), to rapidly adapt to lower interconnect needs, a step adaptation in accordance with an embodiment of the present invention is abandoned. Instead a maximum value of the above floor values is used.

A theoretical optimum bandwidth threshold is used to classify traffic as high, low and comfortable. The value represents a level beyond which performance degrades rapidly, either because data is bounced or throttled from entering the system. Different kinds of interconnects with varied size internal buffers may tolerate less or more traffic before performance degradation. As such this threshold is architecture dependent and may be open to post-silicon tuning. When traffic is greater than or equal to the theoretical optimal capacity threshold along any link, it may trigger incrementing of the interconnect operating frequency.

In some embodiments, a trend/hysteresis function (e.g., as provided by N recommendations) may be used, and can be implemented in one embodiment as a circular buffer. In various embodiments, N may be selected in a range to preserve responsiveness, while still protecting from jitter. In one embodiment, N may be between approximately 5 and 7 periods, where a period could be a millisecond. The goal is to keep N neither too large, which would slow adaptation, nor too short, which could cause frequent adaptations, resulting in 'thrashing', with associated loss of useful work during the transitions. Given that every step increase in uncore frequency is akin to a step increase in core frequency for, e.g., up to four cores, the uncore increment/decrement strategy is conservative.

Using an algorithm in accordance with an embodiment of the present invention, if cache fitting applications are running on the system, the interconnect frequency may drop. This in turn can realize reduced power consumption. Likewise an increase in interconnect frequency and/or power consumption can occur in the presence of a cache streaming workload. In general, a cache fitting application implies the entire working set of memory references for an application fits in the cache. Cache streaming implies that the application constantly brings in new lines, trashing the cache, and causing cache refreshes that generate more interconnect traffic.

A processor in accordance with one embodiment of the present invention may include a fully integrated voltage regulator (FIVR) such that per core P-states (PCPS) can be provided. In this way, cores can be operated at frequencies independently of each other. Thus embodiments combine this flexibility, information about core stall and active sensor data, and configured EPB to determine the operating point for a core in the turbo range to reap energy performance benefits.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an individual voltage regulator $125_a$-$125_n$. Accordingly, a FIVR implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, each core can include various hardware sensors and other circuitry that can provide information for use in performing a UFS algorithm in accordance with an embodiment of the present invention. More specifically as shown in FIG. 1, each core can include a core activity sensor 122 and a core stall sensor 124.

In one embodiment, core stall sensor 124 may be configured to determine a stall rate of a core which corresponds to a measure of waiting for stores/loads. This stall rate can be determined in various manners, ranging from a simple count of cycles for which the core is stalled to more complicated manners.

In one embodiment, core activity sensor 122 may be configured to determine an activity rate of a core. This activity rate can be determined in various manners, ranging from a simple count of cycles for which the core is active to more complicated manners. In one embodiment, core activity sensor 122 can be configured to count cycles in which one or more threads on a core is in an active C0 state. Without loss of generality assume a physical core is associated with two logical processors or hardware threads, then the core has an active or C0 value that equals the time when one or more associated logical cores is active, in a C0 state during the observation window.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007). While not shown for ease of illustration, understand that additional components may be present within processor 110 such as uncore logic, a power control unit, and other components such as internal memories, e.g., one or more levels of a cache memory hierarchy and so forth. Furthermore, while shown in the implementation of FIG. 1 with an integrated voltage regulator, embodiments are not so limited.

Figure 2:
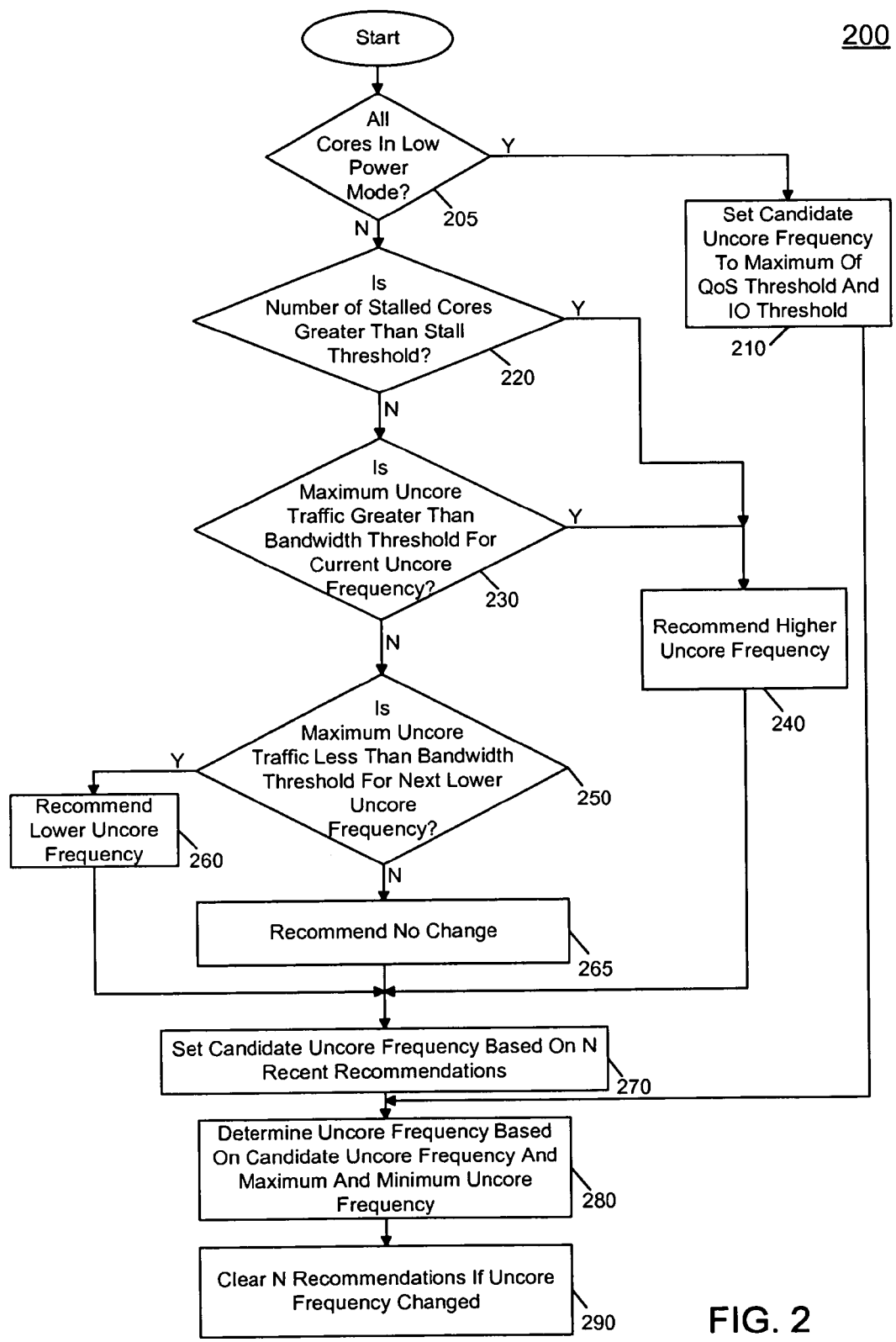
FIG. 2 is a flow diagram of a method of controlling an uncore frequency in accordance with an embodiment of the present invention.

Referring now to FIG. 2, shown is a flow diagram of a method of controlling an uncore frequency in accordance with an embodiment of the present invention. As shown in FIG. 2, method 200 can be performed using uncore frequency control logic of a PCU. Method 200 may begin by determining whether all cores of a multicore processor are in a low power mode, also referred to as an idle state (diamond 205). In one embodiment, when all the cores are in some type of low power or sleep state (e.g., non-C0 state), a package low power state may be present. Accordingly, control passes directly to block 210 where a candidate uncore frequency can be set to the maximum of a quality of service (QoS) threshold and an input/output (IO) threshold. Thus because the package does not have any active cores, the uncore frequency immediately (without any hysteresis period) can be placed in as low a frequency as possible, e.g., sufficient to handle any incoming IO traffic or intersocket traffic (which can also be dynamic).

Still referring to FIG. 2, if at least one of the cores is not in a low power mode, control passes to diamond 220. There, it can be determined whether the number of stalled cores is greater than a stall threshold (diamond 220). In one embodiment, a core can be considered to be stalled based on information received from sensors within each given core, e.g., a core activity sensor and/or a core stall sensor. Also with regard to this stall threshold, it may be set in one embodiment as a scaled value or a percent of total active processors, and may be between approximately 25 and 75% of cores. If the number of stalled cores is greater than this threshold, this is an indication that the cores are suffering from relatively slow response, e.g., due to memory requests. Accordingly, a high latency is occurring for such requests, which causes these cores to be stalling, e.g., due to low bandwidth on the uncore interconnect. Accordingly, control passes from diamond 220 to block 240 in this instance. There, a higher uncore frequency can be recommended. In one embodiment, this recommendation can be made by setting a first recommendation value, e.g., a logic high state, in a list of recommendations that can be analyzed to determine whether to increase uncore frequency. Or for ease of discussion, assume a recommendation counter is present, an increase recommendation can cause an increment in the counter.

Still referring to FIG. 2, if the number of stalled cores is not greater than the stall threshold, control passes to diamond 230 where it can be determined whether the maximum uncore traffic is greater than a bandwidth threshold for the current uncore frequency. This maximum uncore traffic may be obtained from one of multiple uncore traffic sensors, namely the sensor having the highest value. As will be described further below, embodiments can provide for traffic information at many different granularities and manners. If the maximum uncore traffic is thus greater than the bandwidth threshold, this means that the current uncore frequency may not be sufficient to handle the traffic in an optimal manner. Accordingly, control passes also to block 240 for recommending a higher frequency.

Still referring to FIG. 2, if instead the maximum uncore traffic is not greater than this bandwidth threshold, control passes to diamond 250 where it can be determined whether the maximum uncore traffic is less than the bandwidth threshold for a next lower uncore frequency. Thus the maximum uncore traffic level with respect to the next lower uncore frequency can be analyzed to determine whether it is possible to reduce the uncore frequency. If the maximum uncore traffic is below this threshold, control passes to block 260, where a lower uncore frequency recommendation can be made. As described above, this recommendation can be made by setting a recommendation value in a recommendation storage. For this lower recommendation, a second recommendation value, e.g., of a logic low state may be set. Or in the case of a recommendation counter, a decrement in the counter value can occur.

Still referring to FIG. 2, if instead at diamond 250 it is determined that the maximum uncore traffic is not less than the next lower uncore frequency bandwidth threshold, control passes to block 265 where no change is recommended. This can be realized by setting a recommendation value in the recommendation storage, e.g., as a third recommendation value. Or in the case of a recommendation counter, no increment or decrement to the counter may be performed.

As further seen in FIG. 2, from all of blocks 240, 260 and 265, control passes to block 270 where a candidate uncore frequency can be set based on the N most recent recommendations. By using more than one recommendation (with each recommendation corresponding to a given observation interval), a measure of hysteresis can be provided to ensure that the uncore frequency is not changed too often, as there are various amounts of overhead required for this frequency change. Control next passes to block 280 where the uncore frequency can be determined based on this candidate uncore frequency and maximum and minimum uncore frequencies. More specifically, embodiments may limit the uncore frequency to at most the maximum uncore frequency and at least to the minimum uncore frequency, which can be per part values, e.g., stored in a fuse or other non-volatile storage.

As further seen, control passes to block 290 where the N recommendations can be cleared out if this frequency is changed. In this way, the uncore frequency thus does not change in consecutive observation intervals, and instead a subsequent change could not take effect until at least threshold number of observation intervals occur. For example, if the observation window is 5 and the threshold is 3, and three consecutive increment requests of (+1, +1, +1) occur an increase is performed. However recommendations of (+1, 0, +1, 0, +1) cause a wait for the full N width of the observation interval before an increment occurs. The observation interval, which can be a programmable threshold, e.g., set by an OS firmware, user or so forth, may, in an exemplary embodiment, be between approximately 0.5 and 4 ms, and at 1 ms in one embodiment. Although shown with this particular implementation in the embodiment of FIG. 2, understand the scope of the present invention is not limited in this regard.

In general, the algorithm of FIG. 2 may provide a method for determining whether a number of stalled cores of a multicore processor is greater than a stall threshold. If so, a recommendation may be made that an operating frequency of uncore circuitry of the processor be increased. Then based on multiple recommendations, a candidate operating frequency of the uncore circuitry can be set. Next, using one of this candidate operating frequency and maximum and minimum operating frequencies of the uncore, an operating frequency for the uncore circuitry can be determined.

Figure 3:
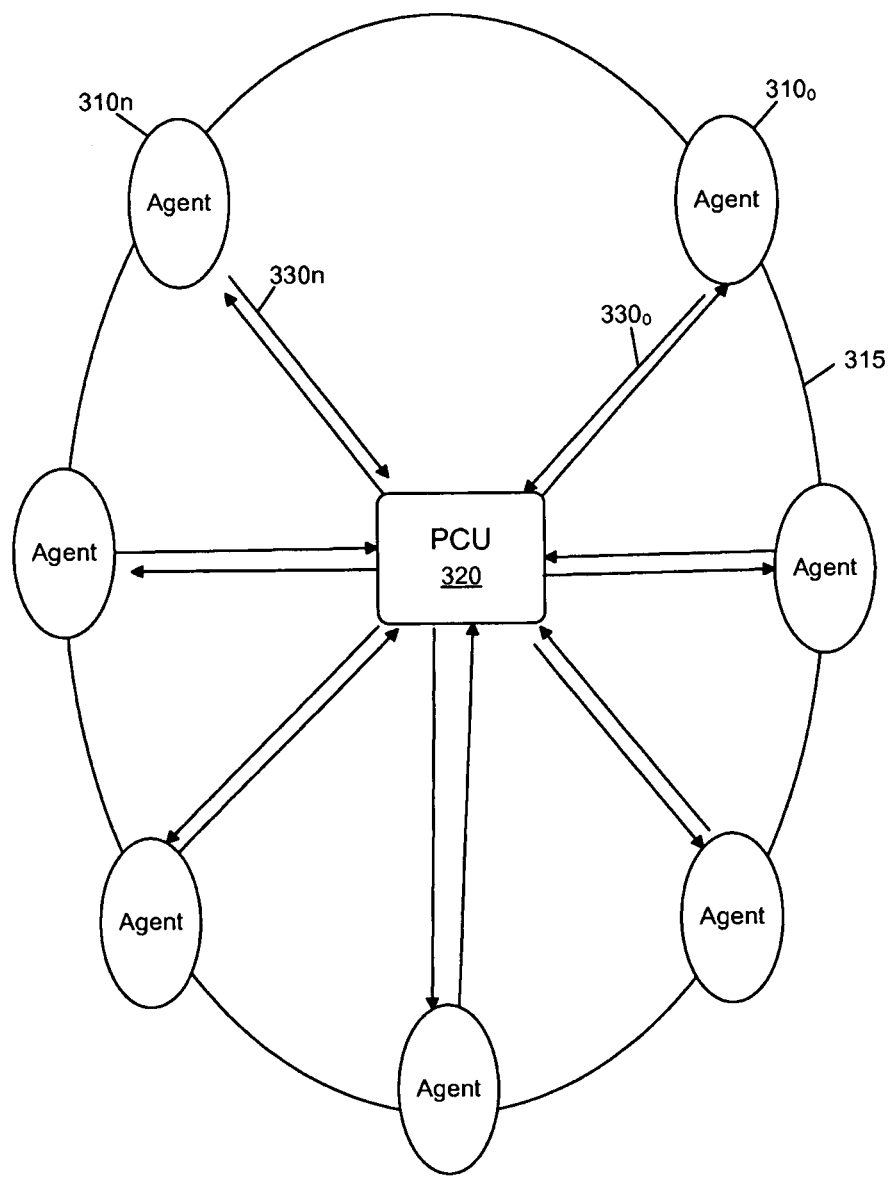
FIG. 3 is a block diagram of a processor in accordance with another embodiment of the present invention.

Referring now to FIG. 3, shown is a block diagram of a processor in accordance with another embodiment of the present invention. As shown in FIG. 3, a processor 300 may include a plurality of agents $310_0$-$310_n$. Each of these agents can correspond to a given traffic agent that can both act as a sink and a source of traffic communicated between the agents via an interconnect 315, which in the embodiment shown in FIG. 3 is a ring interconnect. Although the scope of the present invention is not limited in this regard, many different types of agents including cores, processing engines, fixed function units, IO connections, memory, inter-socket connections among many others may be present.

To enable communication of traffic information for use in uncore frequency control, further interconnections 330a-330n may be provided between each agent 310 and PCU 320. As seen, bidirectional paths may be present such that control information, e.g., to configure traffic sensors associated with each interconnect stop can be communicated. In addition, control signals to poll for or push information can be provided. In turn, the corresponding traffic sensor data is communicated to PCU 320.

Note that the illustration in FIG. 3 of the various agents 310 is generally understood to include a small portion of interconnect logic (generally referred to as an interface unit) including buffers, control logic and so forth to enable communication of information between the agents via interconnect stops that interface between a given agent and interconnect 315. In addition, these interconnect stops each may include one or more traffic sensors. Although located at this position in certain embodiments, understand that the traffic sensors could be otherwise located such as at interfaces of the agents themselves, or at other portions along an interconnect.

Figure 4:
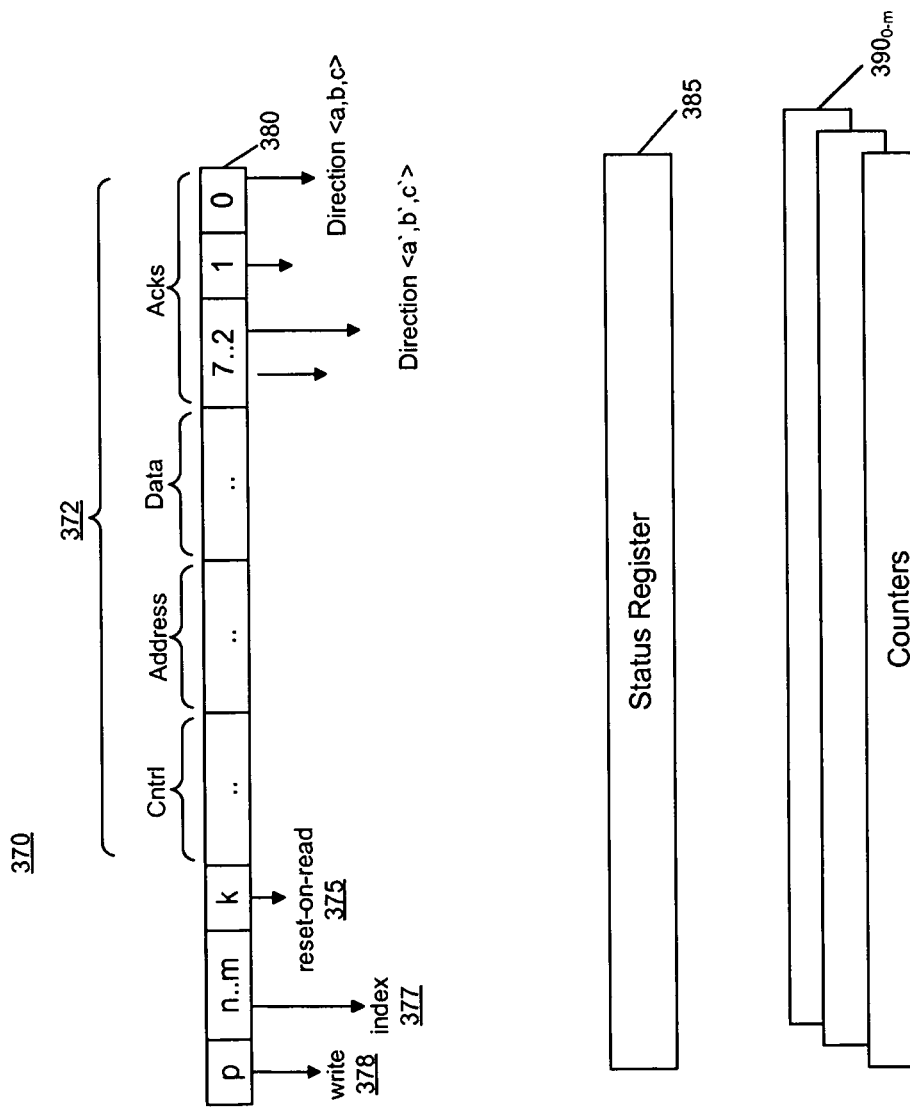
FIG. 4 is a block diagram of a traffic sensor in accordance with an embodiment of the present invention.

Referring now to FIG. 4, shown is a block diagram of a traffic sensor in accordance with an embodiment of the present invention. As shown in FIG. 4, traffic sensor 370 may be a single traffic sensor located at an interconnect stop or other interface logic associated with an interconnect. In general, traffic sensor 370 may include various storages to provide for control and configuration of the sensor as well as to enable maintaining traffic measurements in accordance with an embodiment of the present invention.

As seen in FIG. 4, traffic sensor 370 may include a control register 380. In various embodiments, control register 380 may include a plurality of fields, each of which can be set under control of, e.g., PCU logic. As seen, control register 380 can include a traffic type field 372 for each type of communication possible on the interconnect, including a control field, an address field, a data field, and an acknowledgement field. In addition, control register 370 may include a reset-on-read field 375, an index field 377, and a write field 378.

In general, the traffic type fields 372 (e.g., the control, address, data and acknowledgment fields) each can include a plurality of bits each to indicate whether traffic of a particular direction is to be counted. Accordingly, these traffic type fields can act as a filter such that the traffic sensor only counts traffic in certain directions, e.g., for efficiency and power consumption purposes. In one embodiment, three dimensions of directions can be controlled, namely north/south, east/west, in/out. In one embodiment, a logic high value for a given bit of any of these fields indicates that traffic of the corresponding type in the indicated direction is to be counted.

Note that the count operations themselves may occur by incrementing a value in a corresponding one of multiple counters $390_0$-$390_n$. Each such counter may maintain a count of a data type along a given direction tuple.

Referring back to control register 370, reset-on-read field 375 may be set to indicate that counters 390 should be reset on a read operation. In turn, index field 377 may be used to index an individual count or the maximum of all counts. That is, in an embodiment a set of bit values may correspond to the counter to be read. For example, for 6 different counters (e.g., one kind of traffic type, up/down, in/out, left/right), 3 bits may uniquely index one of the counters. Instead if index field 377 is set to all zeros, a maximum of all counts may be provided. Finally, a write field 378 may be set responsive to a poll request so that the indicated counter (e.g., according to index field 377) can be written into a status register 385. In various embodiments, status register 385 may thus contain the value to be read or be written and can be sized to hold the maximum traffic count possible. Without loss of generality, traffic can be determined as a function of traffic of each type and direction. Thus varied combinations of the traffic are possible, such as weighting data more than acknowledgements.

Thus to effect a write of control register 370, the PCU may provide a value to be stored in status register 385 and then on a write operation, e.g., as indicated by write field 379, the value in status register 385 can be stored into control register 370. In so doing, a flexible configuration of the traffic sensors is possible independent of each other. Although shown at this high level in the embodiment of FIG. 4, understand that the scope of the present invention is not limited in this regard. Furthermore, understand that traffic sensor 370 shown in FIG. 4 can be replicated at every interconnect stop. In many embodiments, a single traffic sensor may be associated with each interconnect stop, e.g., at an input port or an output port, but implementations may avoid providing two such traffic sensors per interconnect stop for purposes of reducing real estate and power consumption. Further, understand that the PCU (e.g., PCU 320 of FIG. 3) may include a sensor mask to store information to selectively control operation of the sensors. In one embodiment, this mask may include a plurality of bits each associated with a given traffic sensor. In this way, sensors associated with interconnect stops can be turned off to save power and processing time. For example, bits of a first (e.g., high) state may enable the corresponding sensor and bits of a second (e.g., low) state may disable the corresponding sensor. In this way, interconnect stops that act as relays (or less critical stops) can be disabled.

Thus in one embodiment, multiple traffic sensors can be provided, each to measure communication traffic at a point of an interconnect at which an agent is coupled. In such embodiment, the sensor can include a control storage to store control information to indicate a direction and a type of communication traffic to be measured, a status storage to store a traffic measurement and to provide the measurement to a controller responsive to a request, and multiple counters each to store a traffic measurement for a direction and communication traffic type. Note that the controller can be incorporated into a PCU, and where the controller can operate to set the control storage and read or be communicated the traffic measurement from the status storage. The controller may also include a sensor mask to store a set of indicators, each associated with a sensor and having a first value to disable the corresponding sensor and a second value to enable the sensor.

Figure 5:
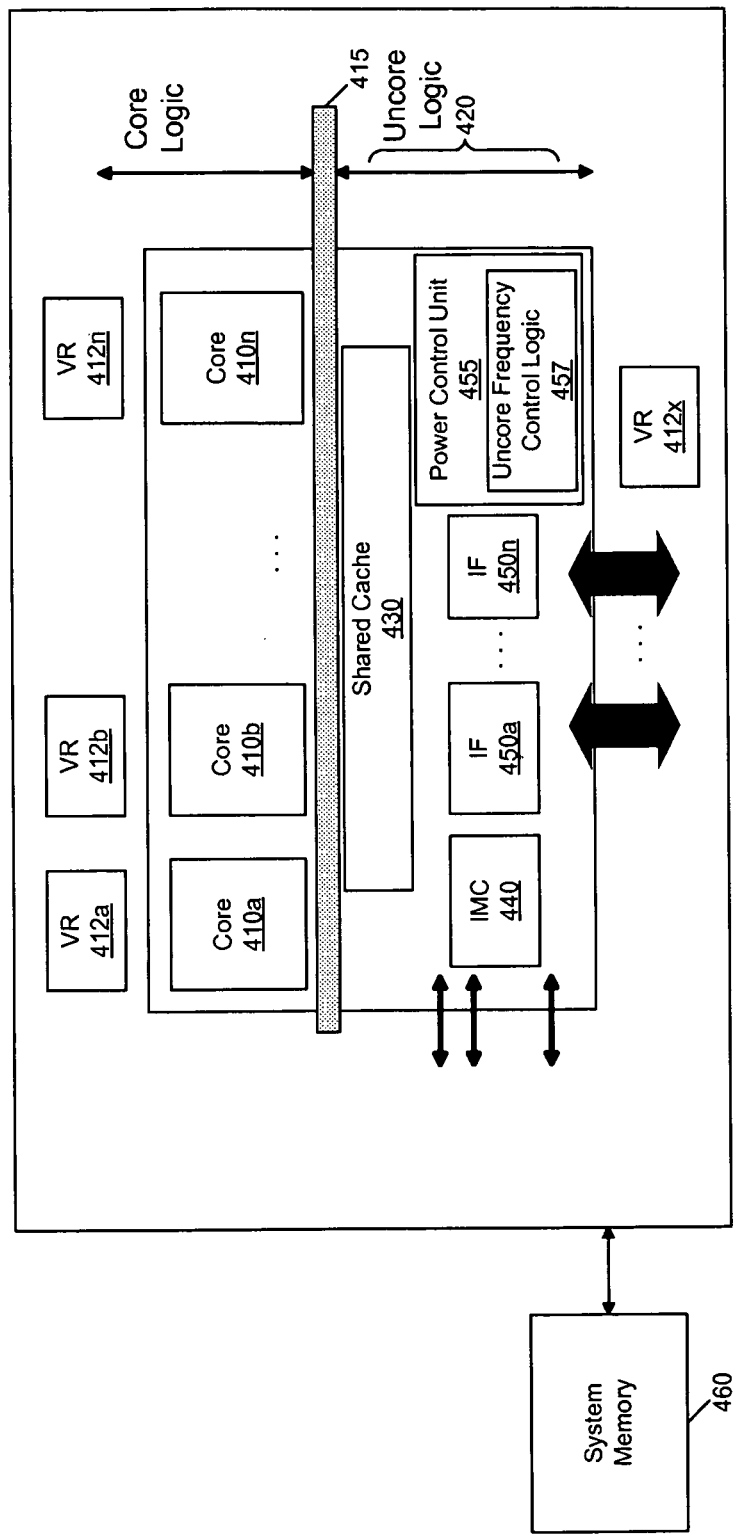
FIG. 5 is a block diagram of a processor in accordance with an embodiment of the present invention.

Referring now to FIG. 5, shown is a block diagram of a processor in accordance with an embodiment of the present invention. As shown in FIG. 5, processor 400 may be a multicore processor including a plurality of cores $410_a$-$410_n$. In one embodiment, each such core may be configured to operate at multiple voltages and/or frequencies. In addition, each core may be independently controlled to operate at a selected voltage and/or frequency. To this end, each core may be associated with a corresponding voltage regulator 412$a$-412$n$. While not shown for ease of illustration, understand that each core 410 can include a core activity sensor and a core stall sensor to provide information for use in uncore frequency control in accordance with an embodiment of the present invention. The various cores may be coupled via an interconnect 415 to an uncore or system agent logic 420 that includes various components. As seen, the uncore 420 may include a shared cache 430 which may be a last level cache. In addition, the uncore may include an integrated memory controller 440, various interfaces 450 and a power control unit 455.

In various embodiments, power control unit 455 may include an uncore frequency control logic 457 that in one embodiment may execute firmware to realize the algorithm set forth in FIG. 2. In this way uncore frequency control logic 457 can determine an appropriate frequency for all or part of the uncore (including the uncore interconnect) based on core stall information and uncore traffic.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
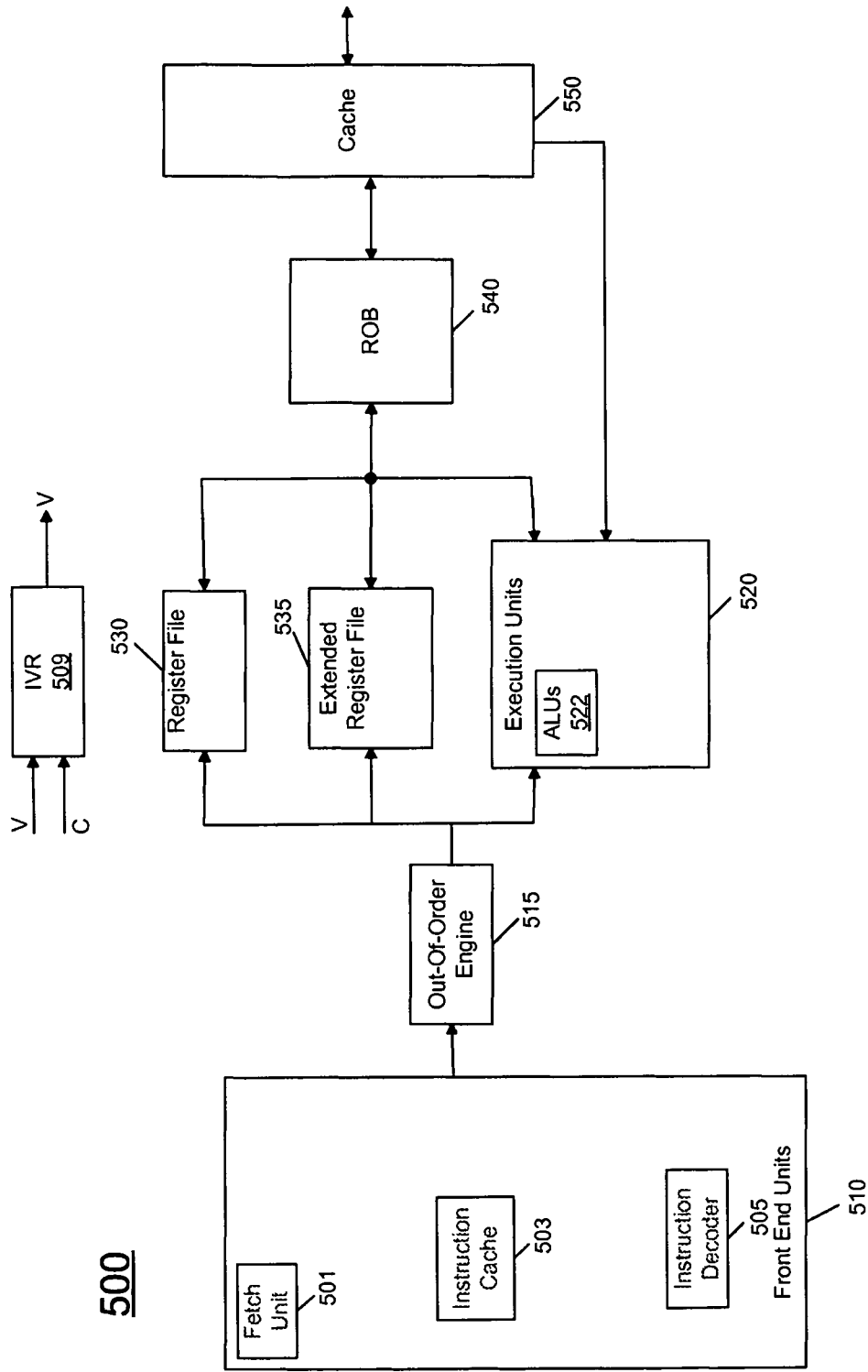
FIG. 6 is a block diagram of a processor core in accordance with one embodiment of the present invention.

Referring now to FIG. 6, shown is a block diagram of a processor core in accordance with one embodiment of the present invention. As shown in FIG. 6, processor core 500 may be a multi-stage pipelined out-of-order processor. As shown in FIG. 6, core 500 may operate at various voltages and frequencies as a result of integrated voltage regulator 509. In various embodiments, this regulator may receive an incoming voltage signal, e.g., from an external voltage regulator and may further receive one or more control signals, e.g., from uncore logic coupled to core 500.

As seen in FIG. 6, core 500 includes front end units 510, which may be used to fetch instructions to be executed and prepare them for use later in the processor. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 6, ROB 540 is coupled to a cache 550 which in one embodiment may be a low level cache (e.g., an L1 cache), although the scope of the present invention is not limited in this regard. Also, execution units 520 can be directly coupled to cache 550. From cache 550, data communication may occur with higher level caches, system memory and so forth. While shown with this high level in the embodiment of FIG. 6, understand the scope of the present invention is not limited in this regard. For example, while the implementation of FIG. 6 is with regard to an out-of-order machine such as of a so-called x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 7:
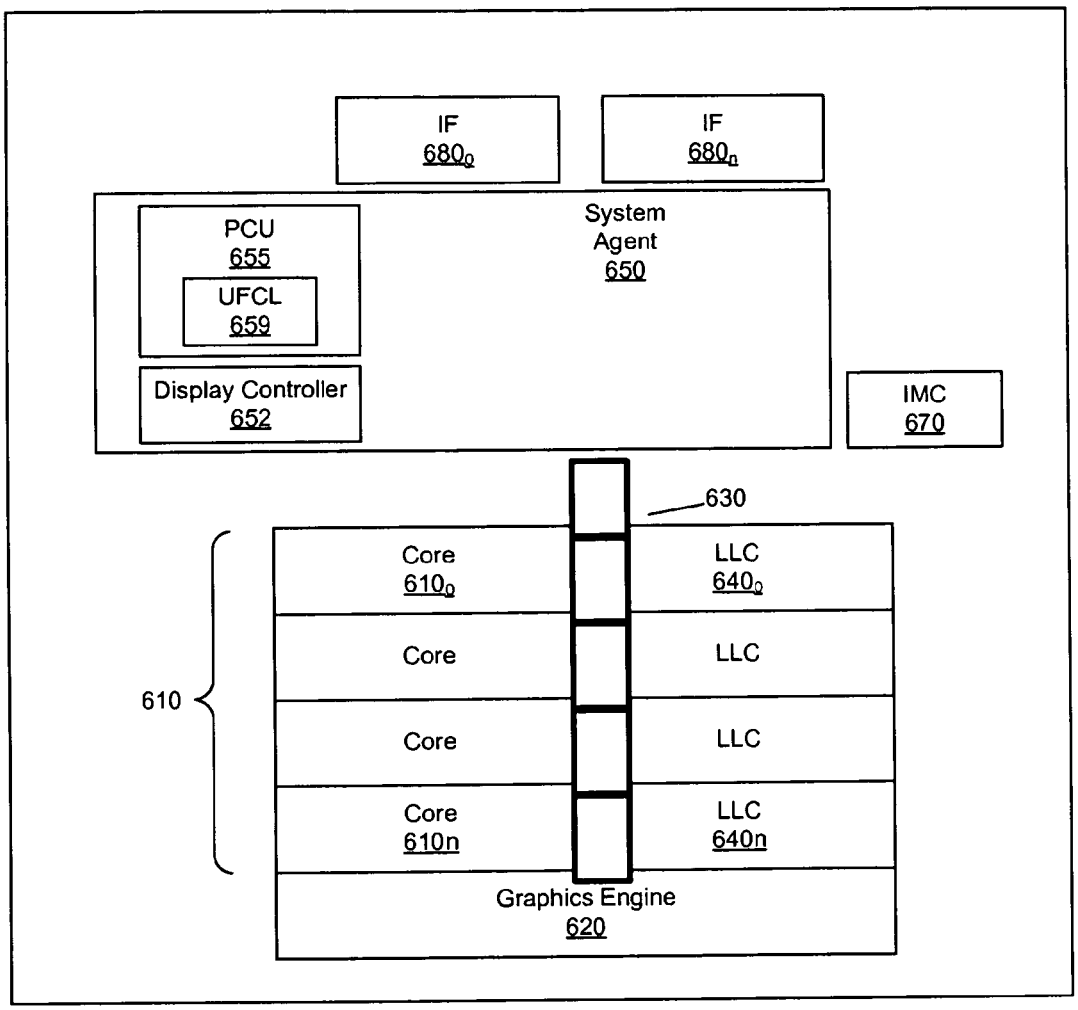
FIG. 7 is a block diagram of a multicore processor in accordance with another embodiment of the present invention.

Referring now to FIG. 7, shown is a block diagram of a multicore processor in accordance with another embodiment of the present invention. As shown in the embodiment of FIG. 7, processor 600 includes multiple domains. Specifically, a core domain 610 can include a plurality of cores $610_0$-$610n$, a graphics domain 620 can include one or more graphics engines, and a system agent domain 650 may further be present. In various embodiments, system agent domain 650 may handle power control events and power management such that individual units of domains 610 and 620 such as cores and/or graphics engines can be controlled to independently dynamically operate at an appropriate turbo mode frequency in light of the activity (or inactivity) occurring in the given unit. Each of domains 610 and 620 may operate at different voltage and/or power, and furthermore the individual units within the domains each may operate at an independent frequency and voltage. Note that while only shown with three domains, understand the scope of the present invention is not limited in this regard and additional domains can be present in other embodiments.

In general, each core 610 may further include low level caches in addition to various execution units and additional processing elements. In turn, the various cores may be coupled to each other and to a shared cache memory formed of a plurality of units of a LLC $640_0$-$640_n$. In various embodiments, LLC 640 may be shared amongst the cores and the graphics engine, as well as various media processing circuitry. As seen, a ring interconnect 630 thus couples the cores together, and provides interconnection between the cores, graphics domain 620 and system agent circuitry 650.

As further seen, system agent domain 650 may include display controller 652 which may provide control of and an interface to an associated display. As further seen, system agent domain 650 may include a power control unit 655 which can include uncore frequency control logic 659 in accordance with an embodiment of the present invention to control a frequency of the system agent domain (or at least ring interconnect 630) based on traffic information and/or core stall information of the cores. In various embodiments, this logic may execute the algorithm described above in FIG. 2.

As further seen in FIG. 7, processor 600 can further include an integrated memory controller (IMC) 670 that can provide for an interface to a system memory, such as a dynamic random access memory (DRAM). Multiple interfaces $680_0$-$680_n$ may be present to enable interconnection between the processor and other circuitry. For example, in one embodiment at least one direct media interface (DMI) interface may be provided as well as one or more Peripheral Component Interconnect Express (PCIe™) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 7, understand the scope of the present invention is not limited in this regard.

Figure 8:
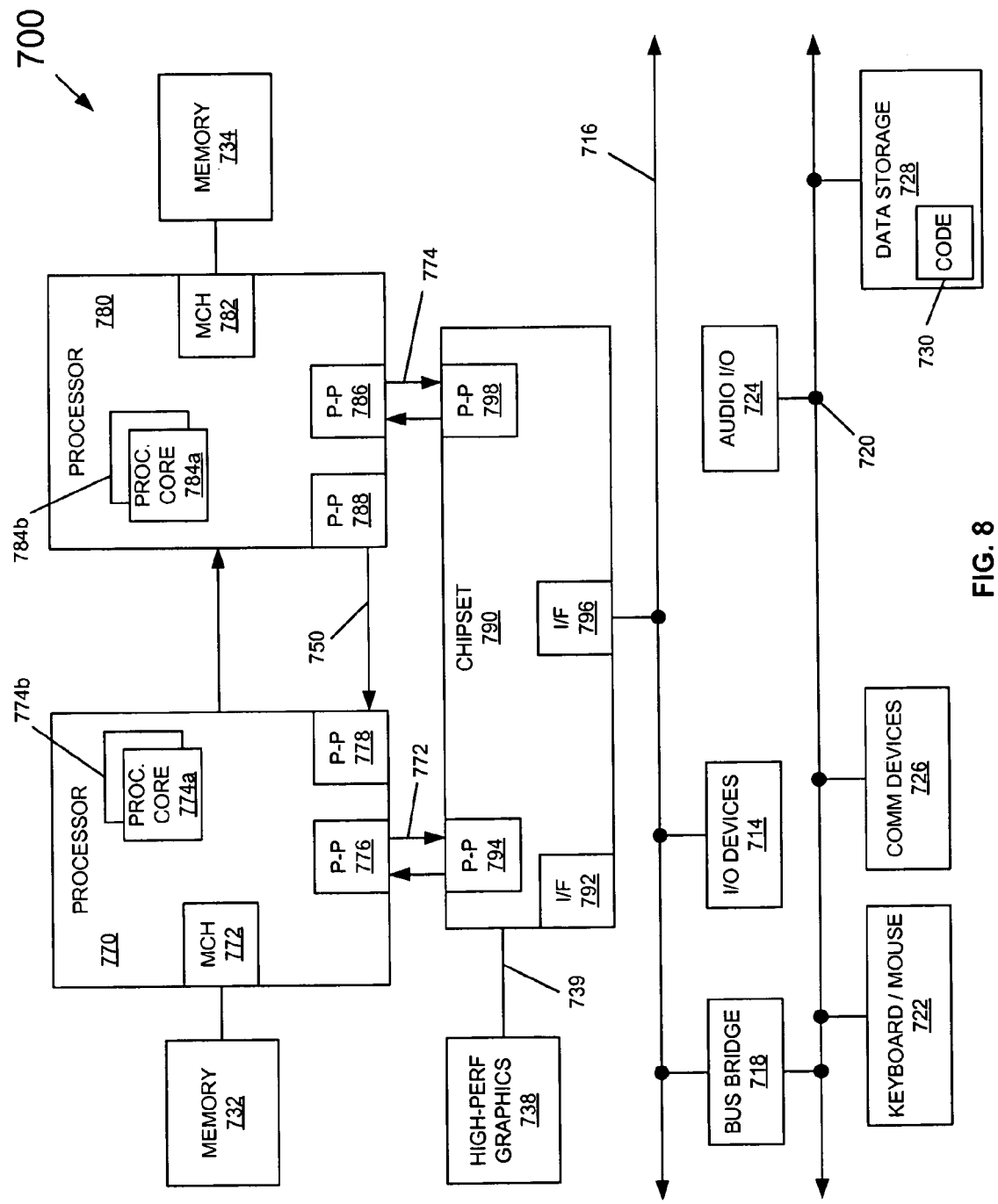
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 700 is a point-to-point interconnect system, and includes a first processor 770 and a second processor 780 coupled via a point-to-point interconnect 750. As shown in FIG. 8, each of processors 770 and 780 may be multicore processors, including first and second processor cores (i.e., processor cores 774*a* and 774*b* and processor cores 784*a* and 784*b*), although potentially many more cores may be present in the processors. Each of the processors can include a PCU or other logic to perform dynamic control of interconnect frequency, as described herein.

Still referring to FIG. 8, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 8, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 752 and 754, respectively. As shown in FIG. 8, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 8, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. Embodiments can be incorporated into other types of systems including mobile devices such as a smart cellular telephone, tablet computer, netbook, ultrabook, or so forth.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Using an embodiment of the present invention, better power distribution between cores and interconnect to increase performance and save power can be realized. The sensor data provides input to the firmware to detect when and how to adapt uncore interconnect operating frequency. Under-utilization presents an opportunity to save power, or divert it to the cores to operate them faster and gain performance. Over-utilization may cause the uncore interconnect to operate faster in order to sustain forward progress on the cores. Thresholds used in decision making may in some embodiments be guided by a consumer configured energy/performance bias. Using an embodiment of the present invention, cooling bills and chip power consumption may reduce in idle cases and rise only under heavy system utilization.

Traffic sensors may provide valuable pattern traffic insights to better adapt interconnect operating frequency to meet dynamic demands. In this way, uncore power savings can be realized even under non-package idle scenarios. Embodiments thus take into consideration that core frequency needs may be orthogonal or at least not closely related to uncore interconnect frequency needs.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a traffic sensor to measure communication traffic at a point of an interconnect at which an agent is coupled to the interconnect, the traffic sensor including:
  a control storage to store control information to indicate a direction and a type of communication traffic to be measured by a plurality of counters;
  a status storage to store a traffic measurement and to provide the traffic measurement to a controller responsive to a request for the traffic measurement; and
  the plurality of counters each to store a traffic measurement for a particular direction and a particular communication traffic type.

2. The processor of claim 1, further comprising the controller, wherein the controller is to set the control storage and to read the traffic measurement from the status storage, wherein the controller is to issue a poll request or receive a push request to read the traffic measurement.

3. The processor of claim 2, wherein the controller includes a sensor mask to store a first value to disable the traffic sensor and a second value to enable the traffic sensor.

4. The processor of claim 1, wherein the traffic sensor is located at an interface port coupled between the interconnect and a core of a multicore processor, the interconnect corresponding to a ring interconnect.

5. The processor of claim 4, wherein the controller is to control an operating frequency of the interconnect based at least in part on the traffic measurement.

6. The processor of claim 5, wherein the controller is to receive a maximum traffic measurement from each of a plurality of traffic sensors of the multicore processor, and to control the operating frequency of the interconnect based at least in part on a maximum traffic measurement of the maximum traffic measurements received from each of the plurality of traffic sensors.

7. The processor of claim 1, further comprising a plurality of traffic sensors, each distributed within a multicore processor and associated within a stop associated with an agent coupled to the interconnect.

8. A system comprising:
a processor including a plurality of cores, a plurality of voltage regulators each to independently provide a voltage to at least one of the plurality of cores, and system agent circuitry including at least one cache memory, a memory controller and an interconnect to couple the plurality of cores and the at least one cache memory, the interconnect including a plurality of interface units each to couple the interconnect to one of the plurality of cores, wherein each of the interface units includes a traffic sensor to measure traffic at a location of the interconnect associated with the interface unit, the system agent circuitry further including a power controller to receive information regarding the traffic from at least some of the plurality of traffic sensors to control a frequency of the interconnect based on at least some of the information.

9. The system of claim 8, wherein the power controller is to cause the interconnect frequency to be reduced to a selected one of a quality of service (QoS) threshold and an input/output (IO) threshold if the processor is in a low power state.

10. The system of claim 8, wherein each of the plurality of cores further includes an activity sensor to generate an activity value and a stall sensor to generate a stall value, and the corresponding core is to communicate the activity value and the stall value to the power controller for an observation interval.

11. The system of claim 10, wherein the power controller is to cause the interconnect frequency to be increased based on the stall value for at least some of the plurality of cores.

12. The system of claim 10, wherein the power controller is to cause the interconnect frequency to be increased based on a threshold number of cores having a stall value exceeding a stall threshold.

13. The system of claim 8, wherein the power controller is to increase the interconnect frequency based on the information from at least one of the traffic sensors if the information associated with the interface unit having the highest traffic is greater than a bandwidth threshold for a current frequency of the interconnect.

* * * * *